United States Patent [19]

Gaertner

[11] 3,927,080

[45] Dec. 16, 1975

[54] PROCESS FOR PRODUCING N-PHOSPHONOMETHYL GLYCINE

[75] Inventor: Van R. Gaertner, Ballwin, Mo.

[73] Assignee: Monsanto Company, St. Louis, Mo.

[22] Filed: Sept. 3, 1974

[21] Appl. No.: 502,706

[52] U.S. Cl....... 260/502.5; 260/482 R; 260/652 R; 260/682; 260/945
[51] Int. Cl.² ............................................. C07F 9/38
[58] Field of Search .................................. 260/502.5

[56] References Cited
UNITED STATES PATENTS

| | | | |
|---|---|---|---|
| 3,346,488 | 10/1967 | Lyons et al. ..................... | 260/502.5 |
| 3,799,758 | 3/1974 | Franz ............................... | 260/502.5 |

*Primary Examiner*—Joseph E. Evans
*Attorney, Agent, or Firm*—William T. Black

[57] ABSTRACT

N-(phosphonomethyl)glycine is produced by the acid hydrolysis of N-t-butyl-N-(phosphonomethyl)glycine or its esters. N-(phosphonomethyl)glycine is useful as a post-emergent broad spectrum herbicide.

6 Claims, No Drawings

PROCESS FOR PRODUCING N-PHOSPHONOMETHYL GLYCINE

This invention relates to a process for producing N-(phosphonomethyl)glycine by the acid catalyzed hydrolysis of N-t-butyl-N-(phosphonomethyl)glycine or its esters.

It is known that N-(phosphonomethyl)glycine can be produced by the strong acid catalyzed decomposition of N-(phosphonomethyl)iminodiacetic acid and also by the acid hydrolysis of N-benzyl-N-(phosphonomethyl)glycine esters.

It has now been discovered that N-(phosphonomethyl)glycine can be produced by the hydrolysis of N-t-butyl-N-(phosphonomethyl)glycine or its esters with aqueous hydrohalic acid such as hydrochloric acid, hydrobromic acid and hydriodic acid. This reaction is easily conducted and the N-(phosphonomethyl)-glycine produced is of greater than 90% purity inasmuch as the products of the hydrolysis are volatile and easily removed leaving the N-(phosphonomethyl)glycine as a residue.

It is believed that the reaction takes place in accordance with the following equation which, for convenience, shows the acid hydrolysis-decomposition of triethyl N-t-butyl-N-(phosphonomethyl)glycinate

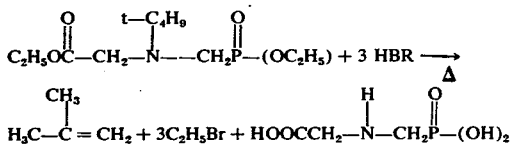

In accordance with the process of this invention, N-(phosphonomethyl)glycine is produced by the acid hydrolysis of an N-tertiary butyl-N-(phosphonomethyl)glycine compound of the formula

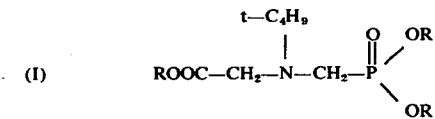

wherein each R is individually hydrogen or an organic group containing from 1 to 18 carbon atoms. Preferably the R's are organic groups containing up to 8 carbon atoms and even more preferably lower alkyl groups.

More particularly, the process of this invention is conducted by forming an admixture of an N-t-butyl-N-(phosphonomethyl)glycine compound of formula (I) with an aqueous hydrohalic acid and heating said admixture to a temperature sufficiently elevated to initiate and sustain the hydrolysis-decomposition reaction.

In conducting the process of this invention, one can employ aqueous hydrohalic acids such as hydrochloric, hydrobromic and hydriodic. It is preferred in conducting the process of this invention that the aqueous hydrohalic acid be at least 20% by weight. It is even more preferred to employ the aqueous hydrohalic acid at concentrations of at least 30% by weight. Although at lower concentration the reaction would take place, the reaction time would be greatly extended and the yields of N-(phosphonomethyl)glycine would be low.

In conducting the process of this invention, the temperature of reaction can range from as low as 90° to 150°C. or even higher. It is preferred for ease of reaction and to obtain the best yield of product to conduct the process of this invention from about 110° to about 130°C., preferably up to the reflux temperature of the particular aqueous hydrohalic acid being employed.

The time of reaction is not narrowly critical and can vary from as low as 1 minute contact time to as high as 40 or more hours. Of course, it is obvious to those skilled in the art that yield of product will vary with the reaction time and the temperature of the reaction. For example, shorter reaction times can be employed when the higher reaction temperatures are employed and longer reaction times will be employed at the lower range of temperature.

The ratio of the hydrohalic acid to the N-t-butyl-N-(phosphonomethyl)glycinate can range from one mole N-t-butyl-N-(phosphonomethyl)glycinate to 100 equivalents acid to 1 part N-t-butyl-N-(phosphonomethyl)glycinate to three equivalents acid. However, for ease of reaction and recovery and economics, it is preferred to employ the N-t-butyl-N-(phosphonomethyl)-glycinate in amounts of from one mole to 10 to 15 equivalents of the hydrohalic acid.

The process of the instant invention is usually conducted at atmospheric pressure for ease of reaction and economics. Higher and lower pressures can be employed if proper venting techniques are employed to allow the escape of the volatile by-products.

The starting materials employed in the process of this invention are prepared by the following general procedure.

The alkyl N-t-butylglycine ester may be prepared from t-butylamine and alkyl bromoacetates. Thus, 16.7 g (0.1 mole) of ethyl bromoacetate was added dropwise to 21.9 g. (0.3 mole) t-butylamine, stirred and cooled at 5°–10°C. A solid precipitated and after stirred 3 hours at 0°–10°C., the mixture was treated with ether and 0.1 mole of 50% aqueous sodium hydroxide solution. The ether layer was separated, dried over anhydromagnesium sulfate, filtered and concentrated. The residual oil was distilled at 85°–100°C./0.3 mm, to give 9.4 g. (58%) of ethyl N-t-butyl-glycinate.

A cooled (10°C.) solution of stable amino acid ester in ethanol, is treated with commercial 36–37% formalin, using 0.1 mole of formaldehyde equivalent for 0.1 mole of amino group content. The addition is slightly exothermic and cooling may be necessary to maintain the mixture at 25°–35°C. To the resulting solution, after stirring about 15 minutes, is added 0.11 mole of the diorgano phosphite at once, cooling below 50°C. if necessary.

The mixture is heated to reflux and then toluene added to remove the alcohol and water by azeotropic distillation. A final period of 1 hour at 115°C. completes the reaction.

The toluene solution is decanted or filtered to remove insoluble salts, then concentrated on a rotary evaporator, finally at 100°/1 mm. or less, to remove unconverted phosphite.

The residual oil is again filtered, if necessary, and distilled in a molecular still, such as a wiped-wall still which minimizes thermal decomposition of labile compounds of low volatility, at high vacuum, in the range of 1–20 microns or at the minimum temperature which will strip the product from less volative, resinous by-products. Triethyl N-t-butyl-N-(phosphonomethyl)- glycinate was prepared in the above manner; it was distilled in a short-path still at 121°–125°C./0.2 mm.

Anal. Calc'd for: $C_{13}H_{28}NO_5P$: C: 50.4; H: 9.12; P: 10.02 Found: C: 50.36; H: 8.95; P: 10.36

The following example serves to further illustrate the invention. All parts are parts by weight unless otherwise expressly set forth.

EXAMPLE 1

A solution of 5.0 g. of N-t-butyl-N-(phosphonomethyl)glycinate in 20 ml. of 48% aqueous hydrobromic acid was changed into a suitable reactor and heated to reflux for 3 hours at 120°C., allowing ethyl bromide and isobutylene to escape through the condenser. The solution was concentrated on the vacuum rotary evaporator to remove most of the excess hydrobromic acid and crystals separated. The slurry was triturated twice with ether, which was decanted, then diluted with ethanol, filtered and rinsed with aqueous ethanol and dried. The white crystals 3.2 g., (95%), were identified as pure N-(phosphonomethyl)glycine by the NMR spectrum in $D_2O$ and by analysis.

Anal. Calc'd for $C_3H_8NO_5P$: C: 21.3; H: 4.77; P: 18.3 Found: C: 20.2; H: 4.80; P: 18.48

What is claimed is:

1. A process for producing N-(phosphonomethyl)glycine which comprises forming an admixture of N-t-butyl-N-(phosphonomethyl)glycine compound of the formula

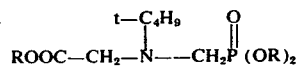

wherein each R is individually hydrogen or an organic group containing up to 18 carbon atoms, with an aqueous hydrohalic acid consisting of hydrochloric, hydrobromic or hydriodic, the concentration of said aqueous hydrohalic acid being at least 20% by weight and heating said admixture to a temperature sufficiently elevated so as to remove said t-butyl group.

2. A process as claimed in claim 1 wherein the temperature is from 100° to 130°C.

3. A process as claimed in claim 2 wherein R is a lower alkyl ester.

4. A process as claimed in claim 3 wherein the aqueous hydrohalic acid is hydrobromic acid.

5. A process as claimed in claim 4 wherein the temperature is from 100° to 130°C.

6. A process as claimed in claim 5 wherein N-t-butyl-N-(phosphonomethyl)glycine compound is triethyl N-t-butyl-N-(phosphonomethyl)glycinate.

* * * * *